Patented Mar. 21, 1939

2,151,513

UNITED STATES PATENT OFFICE 2,151,513

SULPHUR DYES

Walter Hagge, Wolfen, Kreis Bitterfeld, and Karl Haagen, Dessau in Anhalt, Germany, assignors to General Aniline Works, Inc., New York, N. Y., a corporation of Delaware No Drawing. Application July 26, 1938, Serial No. 221,353. In Germany June 16, 1936

16 Claims. (Cl. 260—138)

Our present invention relates to a new process for manufacturing sulphur dyes and to the new dyes obtainable according to this process.

It is an improvement in or modification of that described in our U. S. Patent No. 2,076,143. That specification describes the manufacture of sulphur dyes by treating decacyclene, if desired in the presence of a metal salt, with a sulphurizing agent and working up the crude mass in known manner. There is obtained a red-brown dye yielding dyeings of special clarity and a hitherto unattained reddish tinge.

The present invention consists in the manufacture of equally valuable sulphur dyes yielding yellow-brown to brown-olive tones by subjecting to a sulphurizing process a nitro-compound of decacyclene. By after-treatment with an alkylating agent the dyeings become more vivid and by after-treatment with copper sulphate and potassium chromate greener tints are obtained.

This application is a continuation-in-part of our application Serial No. 142,168, filed May 12, 1937.

The following examples illustrate the invention, the parts being by weight:

*Example 1.*—100 parts of trinitrodecacyclene, obtainable by the action of nitric acid of specific gravity 1.42 on decacyclene at 0 to 18° C., are mixed with 200 parts of sulphur in 300 parts of crystallized sodium sulphide and the mixture is heated while stirring in a reflux apparatus for about 26 hours at 118° C. The temperature of the mass is slowly raised to 170° C. and is then kept at this degree for about 18 hours. The crude dye can be used as such for dyeing or itm ay be dissolved by means of sodium sulphide and water and the dye separated in known manner. In this case about 155 parts of dye are obtained which dye cotton yellow-brown tints of good fastness.

When raising the temperature, for instance, up to about 280° C., a clear reddish catechu dyeing sulphur dye is obtained, which becomes reddish brown when finishing sulphurizing at a still higher temperature.

*Example 2.*—100 parts of hexanitrodecacyclene, obtainable by the action of nitric acid of specific gravity 1.5 on decacyclene at about 20° C., are introduced into a polysulphide solution made from 350 parts of crystallized sodium sulfide and 150 parts of sulphur and the whole is heated for 24 hours at a temperature of 115° C. under reflux. The mixture is then gradually evaporated to dryness and the residue is baked for about 20 hours at 220° C. The crude mass is dissolved in known manner in water and the dye precipitated by means of acid. The yield of dye is 105 to 110 parts. It dyes cotton khaki tints which have especially good fastness to light as well as other good properties of fastness. When baking the sulphur dye at a temperature of about 280° C., it dyes cotton brown tints. The dyes finished at temperatures higher than 280° C. dye black-brown tints.

*Example 3.*—700 parts of enneanitrodecacyclen obtainable by acting upon hexanitrodecacyclen with anhydrous nitric acid at a temperature of about 50 to about 70° C. for some hours until the reaction product is dissolved in the acid from which it is separated by addition of ice in form of a brick-red powder, are introduced into a polysulphide solution prepared from 1050 parts of sulphur and 2450 parts of crystallized sodium sulphide and are boiled under reflux at about 113° to about 120° C. The mixture is then evaporated to dryness and the temperature is slowly raised to about 270° to about 280° C. This temperature is maintained for some hours. The crude melt thus obtained dissolves without residue in diluted sodium sulphide solution and can be used as such without further purification for dyeing. About 2380 parts of the sulphur dye are obtained in this manner. It dyes cotton dark-brown tints.

It is obvious that our invention is not limited to the foregoing examples or to the specific details given therein. Thus, for instance, other nitrodecacyclenes than those named in the examples, may be used. Furthermore, the sulphurizing conditions may be varied and as sulphurizing compounds there may be used, for instance, sulphur chloride or molten sulphur.

By varying the temperatures maintained during the sulphurizing process, the tints of the dyes may be also varied as indicated in the examples.

The sulphurizing process may be carried out in the presence of heavy metal salts, such as copper-, nickel- or molybdenum salts. All these variations are well known in the art and are intended to be in the scope of the claims following hereafter.

What we claim is:

1. The process which comprises heating a nitrodecacyclene with a sulphurizing agent to the reaction temperature.

2. The process which comprises heating a nitrodecacyclene with an alkali metal polysulphide to the reaction temperature.

3. The process which comprises heating a trinitrodecacyclene with a sulphurizing agent to the reaction temperature.

4. The process which comprises heating a hexanitrodecacyclene with a sulphurizing agent to the reaction temperature.

5. The process which comprises heating an enneanitrodecacyclene with a sulphurizing agent to the reaction temperature.

6. The process which comprises heating a trinitrodecacyclene with an alkali metal polysulphide to the reaction temperature.

7. The process which comprises heating a hexanitrodecacyclene with an alkali metal polysulphide to the reaction temperature.

8. The process which comprises heating an enneanitrodecacyclene with an alkali metal polysulphide to the reaction temperature.

9. The process which comprises boiling a nitrodecacyclene in an alkali metal polysulphide solution, evaporating to dryness and baking the residue at a temperature up to about 280° C.

10. The process which comprises boiling a trinitrodecacyclene in an alkali metal polysulphide solution, evaporating to dryness and baking the residue at a temperature up to about 280° C.

11. The process which comprises boiling a hexanitrodecacyclene in an alkali metal polysulphide solution, evaporating to dryness and baking the residue at a temperature up to about 280° C.

12. The process which comprises boiling an enneanitrodecacyclene in an alkali metal polysulphide solution, evaporating to dryness and baking the residue at a temperature up to about 280° C.

13. Sulphur dyes dyeing cotton brownish to brown tints of good fastness, obtainable according to the process claimed in claim 1.

14. Sulphur dyes dyeing cotton brownish tints of good fastness, obtainable according to the process claimed in claim 6.

15. Sulphur dyes dyeing cotton brown tints of good fastness, obtainable according to the process claimed in claim 7.

16. Sulphur dyes dyeing cotton brown tints of good fastness, obtainable according to the process claimed in claim 8.

WALTER HAGGE.
KARL HAAGEN.